(12) United States Patent
Shen et al.

(10) Patent No.: US 11,761,555 B2
(45) Date of Patent: Sep. 19, 2023

(54) CONTROL DEVICE AND CONTROL SYSTEM FOR GAS FLOW

(71) Applicants: WAL Low Carbon Technology (Beijing) Company, Beijing (CN); WAL Low Carbon Technology (Anhui) Co., Ltd., Anhui (CN)

(72) Inventors: Donghao Shen, Beijing (CN); Guizhi Sun, Beijing (CN); Derun Wei, Anhui (CN)

(73) Assignees: WAL Low Carbon Technology (Beijing) Company, Beijing (CN); WAL Low Carbon Technology (Anhui) Co., Ltd., Anhui (CN)

(*) Notice: Subject to any disclaimer, the term of this patent is extended or adjusted under 35 U.S.C. 154(b) by 225 days.

(21) Appl. No.: 17/034,911

(22) Filed: Sep. 28, 2020

(65) Prior Publication Data

US 2021/0164582 A1 Jun. 3, 2021

(30) Foreign Application Priority Data

Dec. 3, 2019 (CN) .......................... 201922145156.X (51) Int. Cl.
*F16K 31/04* (2006.01)
*F16K 11/044* (2006.01)
*F16F 1/12* (2006.01)
*F16K 31/50* (2006.01)

(52) U.S. Cl.
CPC ............ *F16K 31/047* (2013.01); *F16F 1/122* (2013.01); *F16K 11/044* (2013.01); *F16K 31/508* (2013.01)

(58) Field of Classification Search
CPC .......... F16K 1/42; F16K 1/427; F16K 11/044; F16K 31/047; F16K 31/508
USPC ..................................................... 251/129.11
See application file for complete search history.

(56) References Cited

U.S. PATENT DOCUMENTS

| 2,886,283 | A | * | 5/1959 | Natho | F16K 1/46 |
| | | | | | 251/363 |
| 3,263,961 | A | * | 8/1966 | Varga | F16K 1/42 |
| | | | | | 251/363 |
| 5,184,593 | A | * | 2/1993 | Kobayashi | F02M 26/67 |
| | | | | | 123/568.24 |
| 6,250,602 | B1 | * | 6/2001 | Jansen | F02K 9/58 |
| | | | | | 251/903 |
| 6,662,790 | B1 | * | 12/2003 | Kawamura | F02D 41/0077 |
| | | | | | 123/568.23 |
| 6,857,332 | B2 | * | 2/2005 | Pfister | F16C 19/166 |
| | | | | | 310/20 |

(Continued)

FOREIGN PATENT DOCUMENTS

DE 19527764 A1 * 1/1996 .......... F16K 31/046

*Primary Examiner* — Matthew W Jellett
(74) *Attorney, Agent, or Firm* — Young Basile Hanlon & MacFarlane, P.C.

(57) ABSTRACT

A device for controlling gas flow includes a motor, a valve body connected to the motor, a threaded sleeve configured to be driven by the motor to rotate, a threaded rod matched with the threaded sleeve on a first end of the threaded rod, a first guide sleeve, a compression spring sleeved on the threaded rod; and a valve plate connected to a second end of the threaded rod and configured to cover a vent valve hole. The second end of the threaded rod extends through the first guide sleeve and the first guide sleeve surrounds a part of the threaded rod in axial direction, preventing the threaded rod from rotating.

17 Claims, 9 Drawing Sheets

(56) References Cited

U.S. PATENT DOCUMENTS

| | | | | |
|---|---|---|---|---|
| 7,210,665 | B2 * | 5/2007 | Suzuki | H02K 7/06 251/129.11 |
| 7,348,698 | B2 * | 3/2008 | Ohta | F16H 61/0251 310/49.18 |
| 7,708,168 | B2 * | 5/2010 | Garcia | F16F 1/122 222/339 |
| 8,783,653 | B2 * | 7/2014 | Jamison | F16K 31/0627 137/625.2 |
| 9,568,089 | B2 * | 2/2017 | Phillips | F16H 57/0412 |
| 10,495,198 | B2 * | 12/2019 | Hyun | H02K 7/083 |
| 2001/0007354 | A1 * | 7/2001 | Tokuda | F16K 1/42 251/363 |
| 2006/0071190 | A1 * | 4/2006 | Pfister | F16K 31/047 251/129.11 |
| 2010/0107669 | A1 * | 5/2010 | Wada | F16K 31/0634 417/301 |
| 2015/0377107 | A1 * | 12/2015 | Fujita | F01N 3/32 251/318 |
| 2017/0085203 | A1 * | 3/2017 | Andrieux | H02P 23/24 |
| 2018/0202569 | A1 * | 7/2018 | Kawase | F16K 31/53 |

* cited by examiner

FIG. 9 under different implementations.
CONTROL DEVICE AND CONTROL SYSTEM FOR GAS FLOW

CROSS-REFERENCE TO RELATED APPLICATION(S)

This application claims priority to and the benefit of Chinese Application No. 201922145156.X, filed on Dec. 3, 2019, the entire disclosure of which is hereby incorporated by reference.

TECHNICAL FIELD

The disclosure relates to the technical field of flow control devices and control systems, in particular to a control valve for gas flow.

BACKGROUND

A fuel cell is an electrochemical device that combines hydrogen fuel with oxygen to produce electricity. Gas, such as air, enters a fuel cell stack and undergoes a chemical reaction. A fuel cell stack may have a back pressure valve to control the pressure difference between the two sides of a proton exchange membrane of the stack. Several factors, such as amount of gases needed and pressure stability of the gases in the stack, may affect the efficiencies of the fuel cell stack.

The ability to accurately and quickly control gas flow is desirable.

SUMMARY

The present disclosure relates in general to valves and in particular to control valves for gas flow.

One aspect of the disclosed implementations is a device for controlling gas flow, the device may include: a motor; a valve body connected to the motor; a threaded sleeve configured to be driven by the motor to rotate; a threaded rod matched with the threaded sleeve on a first end of the threaded rod; a first guide sleeve; a compression spring sleeved on the threaded rod; and a valve plate connected to a second end of the threaded rod and configured to cover a vent valve hole. The second end of the threaded rod extends through the first guide sleeve and the first guide sleeve surrounds a part of the threaded rod in axial direction, preventing the threaded rod from rotating.

Another aspect of the disclosed implementations is a control system for gas flow, the control system may include a control module and a control device. The control module is configured to communicate with the control device. The control device may include: a motor; a valve body connected to the motor; a threaded sleeve configured to be driven by the motor to rotate; a threaded rod matched with the threaded sleeve on a first end of the threaded rod; a first guide sleeve; a compression spring sleeved on the threaded rod; and a valve plate connected to a second end of the threaded rod and configured to cover a vent valve hole. The second end of the threaded rod extends through the first guide sleeve and the first guide sleeve surrounds a part of the threaded rod in axial direction, preventing the threaded rod from rotating.

These and other aspects of the present disclosure are disclosed in the following detailed description of the embodiments, the appended claims and the accompanying figures.

BRIEF DESCRIPTION OF DRAWINGS

The description herein makes reference to the accompanying drawings wherein like reference numerals refer to like parts throughout the several views.

DETAILED DESCRIPTION

After it passes through filter, compressor, and humidifier, gas, such as air, enters a fuel cell stack and undergoes a chemical reaction. However, under different working conditions, the amount of air required to participate in the reaction is different. In some cases, an air control valve is needed to adjust the air flow into the fuel cell stack.

A fuel cell stack may have a back pressure valve, which is a valve used to control the pressure difference between the two sides of the proton exchange membrane of the stack within a certain range. The back pressure valve is generally arranged on the air side, that is, on the cathode side. The working efficiency of the fuel cell is affected by temperature, reactant concentration, pressure, etc. From the perspective of thermodynamics, increasing pressure of the reactant gas has no obvious effect on the reversible voltage of the fuel cell. However, considering the reaction kinetics, higher pressure increases the diffusion coefficient of the gas in the flow channel, which accelerates the diffusion of the reaction gas to the catalytic layer, and reduces the concentration polarization loss of the battery. In general, the smaller the pressure fluctuation, the more stable the performance of the stack is. When the pressure on both sides of the proton exchange membrane fluctuates, the pressure on the cathode side can be adjusted by adjusting the back pressure valve, so as to keep the performance of the fuel cell stack stable.

At present, traditional throttle valves are generally used for both the intake control valve and the back pressure valve. However, in practice, there are the following technical problems: 1) throttle valves use a butterfly valve structure, which has poor sealing performance when closed, resulting unstable pressure adjustment; 2) throttle valves have no bypass valves, the speed of adjusting air flow is relatively slow, and at the same time it causes instability of the intake system; 3) throttle valve wears out, but cannot automatically compensate, resulting greater leakage over time; and 4) throttle valve may be stuck when temperature rises.

According to the present disclosure, a gas flow control device is provided. The device for controlling gas flow may include, for example, a motor; a valve body connected to the motor; a threaded sleeve configured to be driven by the motor to rotate; a threaded rod matched with the threaded sleeve on a first end of the threaded rod; a first guide sleeve; a compression spring sleeved on the threaded rod; and a valve plate connected to a second end of the threaded rod and configured to cover a vent valve hole.

The second end of the threaded rod extends through the first guide sleeve and the first guide sleeve surrounds a part of the threaded rod in axial direction and preventing the threaded rod from rotating.

The device may also include a bypass port provided on the valve body and connected to an intake port provided on the valve body. The bypass port is sealable by a flange.

The device may include a torque arm on each of both axial ends of the compression spring. The torque arm on one end of the compression spring is fitted in a first slot provided in the valve body, and the torque arm on the other end of the compression spring is lock fitted in a second slot provided on the valve plate after twisting the compression spring. The torque arms, after fitted into the first and second slots, prevent the compression spring from moving in circumferential directions.

The device may include a connecting plate arranged between the motor and the valve body. The first guide sleeve may be fitted in a chamber in the connecting plate.

The device may include a bottom plate connected to the valve body and a bottom base connected to the bottom plate. The vent valve hole is fitted through the bottom plate and the bottom base. The bottom plate and the bottom base may be interference press-fitted, the bottom base is provided with a sealing ring, the sealing ring is configured to have a T-shaped structure. The valve plate squeezes the sealing ring when the valve plate is in a position sealing the vent valve hole. The device may function as a shut-off valve to completely stop the flow of gas when the valve plate is in the position sealing the vent valve hole.

The device may also include a frame sealing ring. The frame sealing ring surrounds a part of the threaded rod in the axial direction. An end surface of the frame sealing ring is fitted to a second guide sleeve. And the threaded rod extends through the second guide sleeve.

The device may include a compression ring. The threaded rod extends through the compression ring; the compression ring is snugly fitted on a chamber of the valve body; and an end of the compression ring is snugly fitted on the first guide sleeve, preventing the first guide sleeve from moving.

The device may include a limiting base provided in the valve body and the limiting base is configured to provide a positive stop on movement of the valve plate when the valve plate is in a position that the vent valve hole has the maximum opening. The contact surface between the valve plate and the limiting base is a conical or spherical surface.

In one implementation, the motor in the device is a stepper motor, a servo motor, a brushed motor or a brushless motor.

In one implementation, the first end of the threaded rod in the device is fitted with a magnet configured for position control of the valve plate. Positions of the magnet is determined by a Hall effect sensor.

In one implementation, in the device, a square hole is provided on the first guide sleeve, the threaded rod is extended through the square hole, and a part of the threaded rod located in the first guide sleeve is provided with a limiting notch that prevents the threaded rod from rotating in the square hole.

The device may include a motor controller configured to control the motor. The motor is controlled to rotate or stop rotating, and the motor may rotate in a first direction or a second direction opposite to the first direction.

In one implementation, the motor controller in the device may include a Controller Area Network (CAN) communication system, and is configured with at least one of: a power-on self-learning diagnostic testing, a valve position indication testing, or a fault detection feedback.

The power-on self-learning diagnostic testing may be used to determine a valve close position and a valve maximum open position of the threaded rod. The valve close position is where the threaded rod moves to place the valve plate fully seal the valve vent hole. The valve maximum open position is where the threaded rod moves to place the valve plate fully uncover the valve vent hole. When the thread rod is at the valve maximum open position, the valve plate may be in contact with the limiting base.

The valve position indication testing sends actual position information of the valve plate in real time. The actual position information of the valve plate may be sent to a fuel cell stack control system. The fuel cell stack control system may include a control module and the control device. The control module may be configured to communicate with the control device.

The fault detection feedback determines a fault of the control device in real time. The fault may be one or more of the following: motor stop, motor current surge protection, CAN self-check failure, motor drive part self-check failure, Hall effect sensor failure, over-temperature protection, power supply voltage over-voltage alarm, power supply voltage under-voltage alarm, valve stuck, abnormal CAN Communication.

A second aspect is a control valve for a fuel cell, the valve includes a motor and a motor controller arranged at the end of the motor and controlling the operation of the motor. A valve body is connected to the bottom of the motor, a connecting plate is arranged between the motor and the valve body, the motor drives a threaded sleeve located in the motor to rotate, the threaded sleeve is matched with a threaded rod, an internal chamber of the connecting plate is provided with a first guide sleeve, and an internal chamber of the valve body is provided with a second guide sleeve. The lower end of the threaded rod passes through the first guide sleeve and the second guide sleeve in turn, the lower end of the threaded rod is connected with a valve plate, and a compression spring is sleeved on the threaded rod. Each of the upper and lower ends of the compression spring is provided with a torque arm, the upper torque arm is locked in a slot provided in the valve body, and the lower torque arm is locked in a slot provided on the valve plate, after the lower torque arm being twisted.

A limiting base for restricting the upward displacement of the valve plate is provided above the valve plate, the contact surface between the valve plate and the limiting base is of a conical or spherical shape. A square is provided on the first guide sleeve. The part of the threaded rod located in the first guide sleeve is provided with a limiting notch that prevents the threaded rod from rotating in the square hole. The lower end of the valve body is connected with a bottom plate, and the bottom plate is provided with a bottom base. The bottom base and the bottom plate are interference press-fitted, the bottom base is provided with a sealing ring, the sealing ring is configured to have a T-shaped structure; the valve body is provided with a bypass port, and the bottom plate is provided with a vent valve hole, The valve plate closes the vent valve hole by squeezing the sealing ring. When the valve plate closes the vent valve hole, the control valve may function as a shut-off valve to completely stop the flow of gas and seal off the fuel cell stack. In another example, the bypass port can be closed with a flange or directly removed according to practical needs. In another example, the sealing ring may not be used according to practical needs.

In one implementation, the control valve further includes a frame sealing ring, the threaded rod extends through the frame sealing ring and one end surface of the frame sealing ring is fitted to the second guide sleeve, and the frame sealing ring can be made of polytetrafluoroethylene material.

In another implementation, the threaded rod extends through a compression ring before the first guide sleeve, the lower end of the compression ring is snugly fitted on the first guide sleeve. The compression ring is snugly fitted on a chamber of the valve body, preventing the first guide sleeve from moving.

In another implementation, the motor may be a stepper motor, a servo motor, a brushed motor or a brushless motor.

In another implementation, the sealing ring may be made of ethylene propylene diene monomer (EPDM) rubber material.

In another implementation, the bottom plate and the valve body are fixedly connected by screws.

In another aspect, each time the valve is energized, the motor controller will perform a power-on self-learning diagnostic testing to determine the zero and maximum positions of the valve plate, so as to ensure that the zero and maximum positions of the valve are accurate. The self-learning function may be used to automatically compensate position changes of the valve plate during wearing. During the operation of the valve, the actual position of the valve can be fed back through a position sensor in real time to achieve closed-loop control and ensure the accuracy of valve opening. In addition, the motor controller may send fault codes of the valve to the fuel cell stack control system when the valve has one or more failures during operation. The operation failures may be: motor stop, overcurrent protection (motor current), Controller Area Network (CAN) self-check failure, motor drive part self-check failure, Hall effect sensor failure, over-temperature protection, over-voltage alarm (power supply voltage), undervoltage alarm (power supply voltage), valve stuck, abnormal CAN communication, etc.

Other details are described herein with reference to the accompanying drawings.

Figure 1:
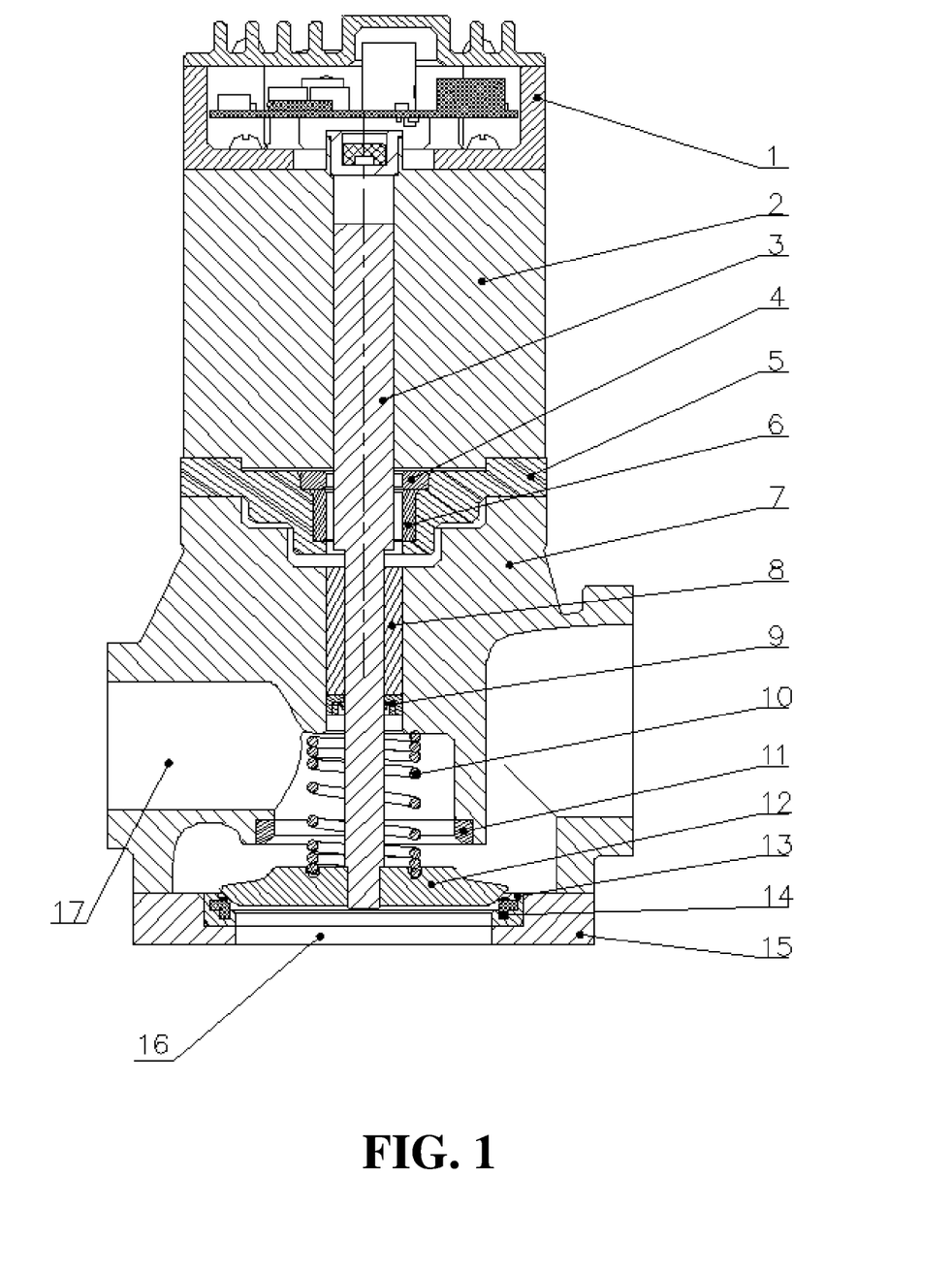
FIG. 1 is an example structure diagram of a gas flow control valve according to an implementation.

As illustrated in FIG. 1, the present disclosure provides an control valve applicable to a fuel cell, the control valve including a compression spring 10, a frame sealing ring 9, a motor 2 and a motor controller 1 arranged at the end of the motor 2 and controlling the operation of the motor 2. The bottom of the motor 2 is connected to a valve body 7, a connecting plate 5 is provided between the motor 2 and the valve body 7, and the motor 2 drives a threaded sleeve located in the motor 2 to rotate. The threaded sleeve is matched with a threaded rod 3, and the lower end of the threaded rod 3 passes through, in turn, a first guide sleeve 6 and a second guide sleeve 8. It should be noted that if the fit gap between the threaded rod 3 and the second guide sleeve 8 is too small, when the temperature rises, thermal expansion and contraction may cause the threaded rod 3 and the second guide sleeve 8 to stuck. Therefore, a reasonable gap should be set between the threaded rod 3 and the second guide sleeve 8.

Figure 3:
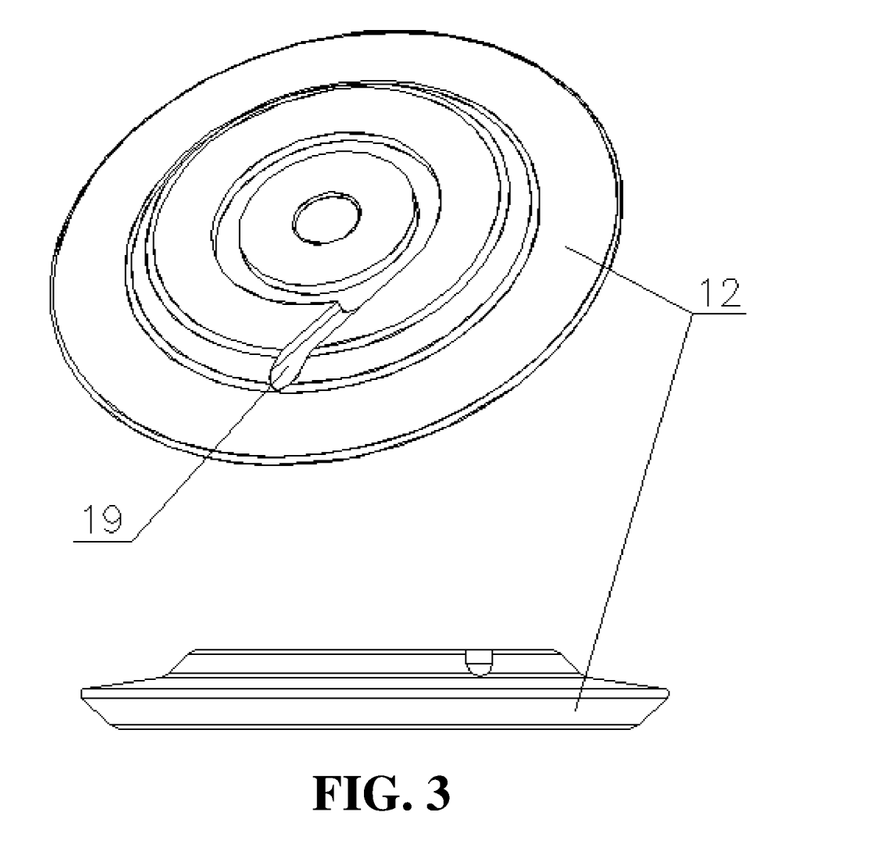
FIG. 3 is an example structure diagram of a valve plate as described in the present disclosure, viewed from different angles.
Figure 5:
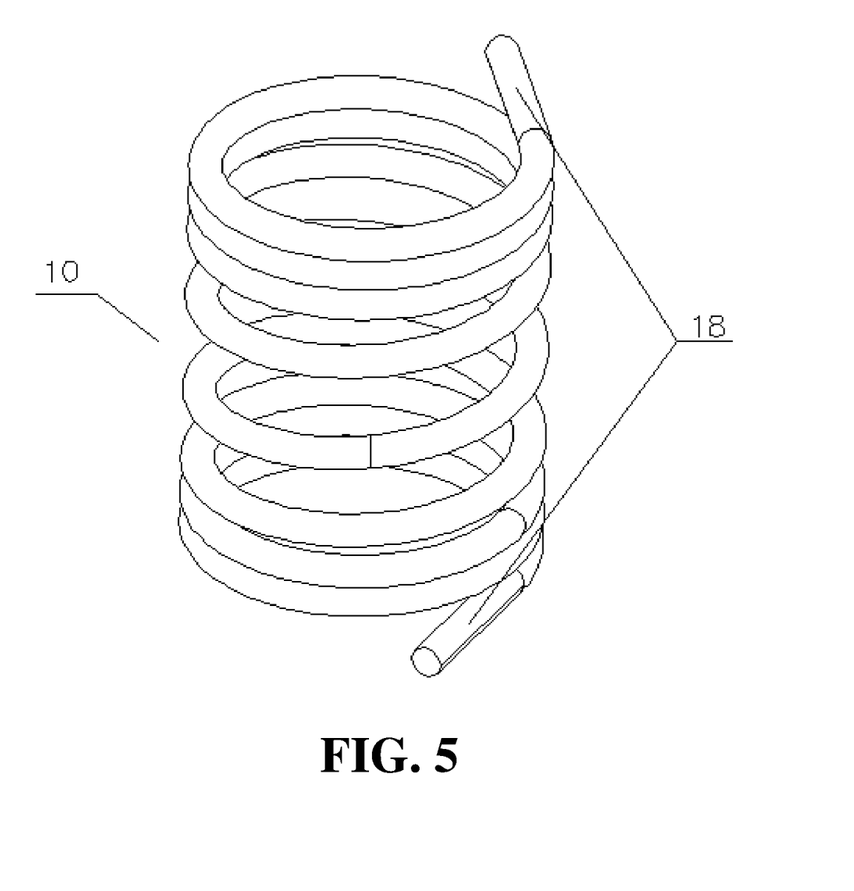
FIG. 5 is an example structure diagram of a compression spring as described in the present disclosure.

As illustrated in FIG. 1, FIG. 3 and FIG. 5, the first guide sleeve 6 may be arranged in the internal chamber of the connecting plate 5, the threaded rod 3 extends through a compression ring 4, and the lower end of the compression ring 4 is snugly fitted on the first guide sleeve 6. The second guide sleeve 8 is arranged in the internal chamber of the valve body 7. a frame sealing ring 9 is penetrated by the threaded rod 3, and one end surface of the frame sealing ring 9 is fitted to the second guide sleeve 8, wherein the frame sealing ring 9 can be made of, but not limited to, polytetrafluoroethylene material. The polytetrafluoroethylene material may allow the frame sealing ring 9 to remain closely fitted with the threaded rod 3 when it expands and contracts under the influence of temperature changes, ensuring the sealing performance. The threaded rod further extends through a compression spring 10. The upper and lower ends of the compression spring 10 are provided with torque arms 18, the upper torque arm is fitted in a groove provided in the valve body 7. During assembling of the control valve, the compression spring 10 exerts a compressive force in the axial direction, and a torque force in the circumferential direction of the compression spring 10. Therefore, the lower torque arm 18 can be twisted and locked in a groove 19 provided on a valve plate 12. In this way, gaps in both the axial and circumferential directions of the valve plate 12 during operation are eliminated, and accuracy of controlling the valve plate 12 is ensured. One example structure of the valve plate 12 is shown in FIG. 3 and can clamp the lower end of the compression spring 10.

Figure 2:
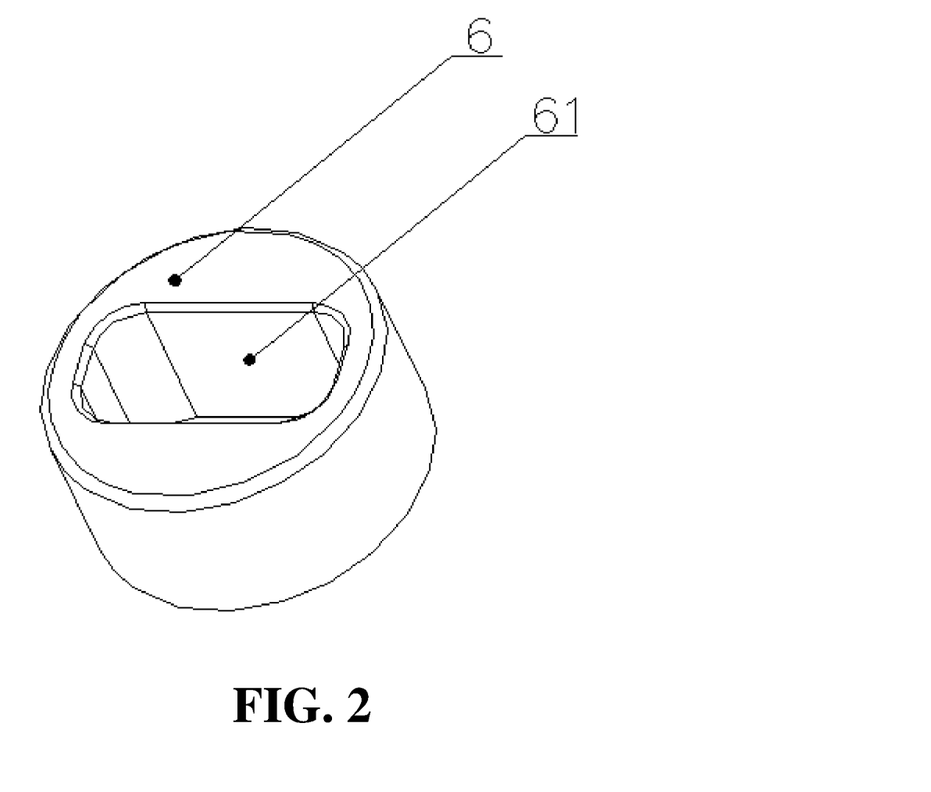
FIG. 2 is an example structure diagram of a first guide sleeve with a square hole as described in the present disclosure.
Figure 4:
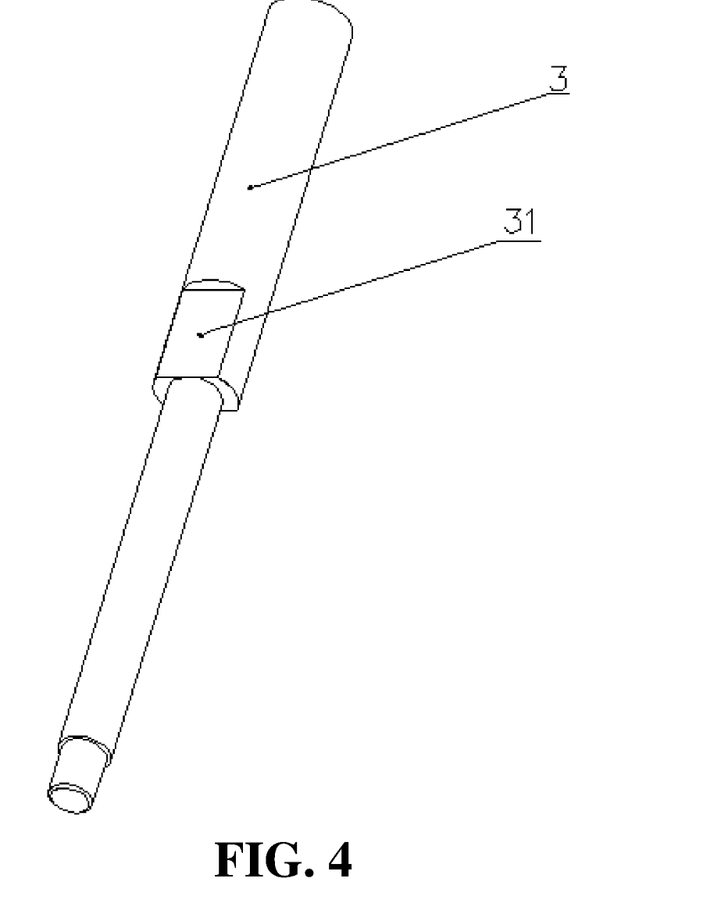
FIG. 4 is an example structure diagram of a threaded rod as described in the present disclosure.

As illustrated in FIG. 1, FIG. 2 and FIG. 4, the lower end of the valve body 7 may be fixedly connected with a bottom plate 15 by screws, the bottom plate 15 is provided with a vent valve hole 16, and the lower end of the threaded rod 3 is connected with the valve plate 12, which may be used for closing the vent valve hole 16. Above the valve plate 12, a limiting base 11 is provided for restricting the upward movement of the valve plate 12. The contact surface between the valve plate 12 and the limiting base 11 may be spherical or conical surface. For one example, the contact surface on the valve plate 12 is spherical and the contact surface on the limiting base 11 is conical. For another example, the contact surfaces on both the valve plate 12 and the limiting base 11 are compensating conical. This sealing method is a linear sealing, which can ensure a better sealing effect. The first guide sleeve 6 is provided with a square hole 61, and the part of the threaded rod 3 located in the first guide sleeve 6 is provided with a limiting notch 31. As illustrated in FIG. 4, in some implementations, the limiting notch 31 may be a flat portion that prevents the threaded rod 3 from rotating in the square hole 61. The bottom plate 15 is provided with a lower base 13, the lower base 13 and the bottom plate 15 are interference press-fitted, and the lower base 13 is provided with a sealing ring 14, which has a T-shaped structure. The valve body 7 is provided with a bypass port 17. The bottom plate 15 is provided with a vent valve hole 16. The valve plate 12 may close the vent valve hole 16 by squeezing the sealing ring 14. The sealing ring 14 may be made of EPDM rubber material, which is elastic and has a stronger sealing effect when working together with the valve plate 12.

Figure 6:
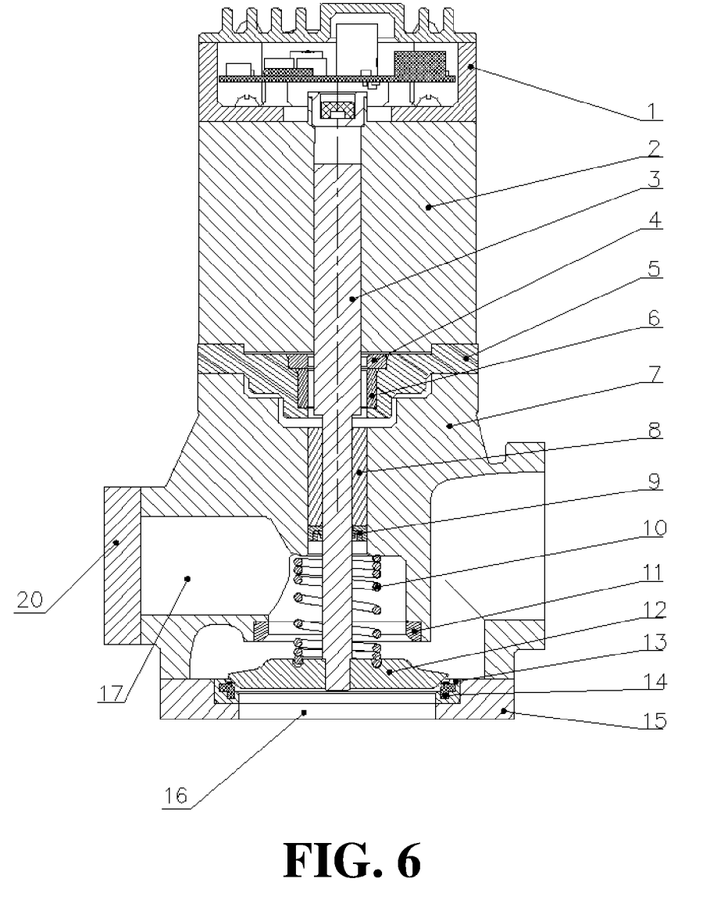
FIG. 6 is an example structure diagram of a gas flow control valve with a closed bypass port according to an implementation.
Figure 7:
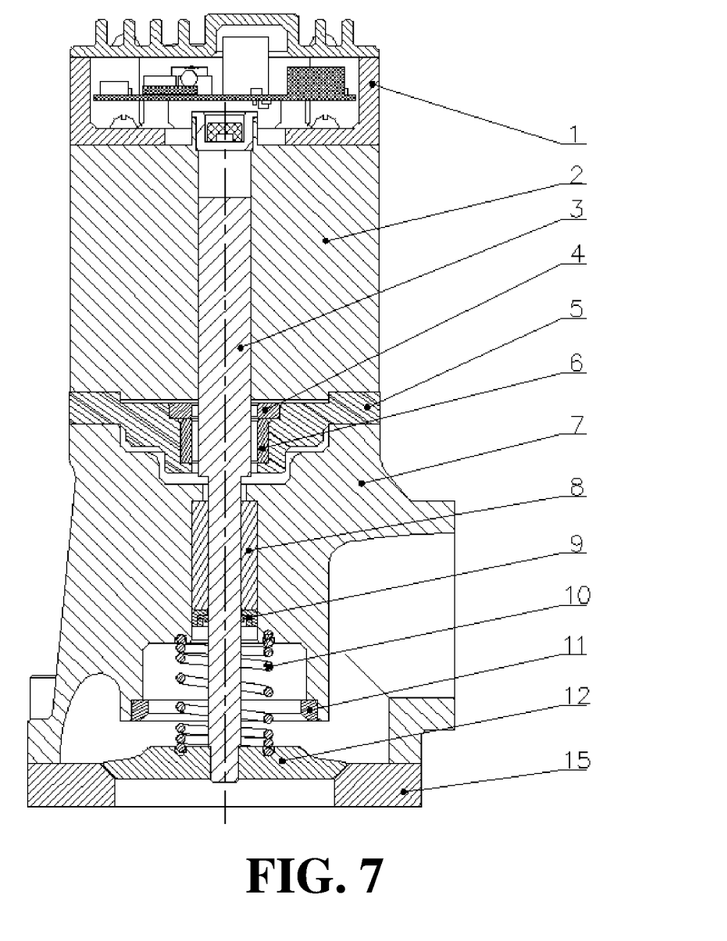
FIG. 7 is an example structure diagram of a gas flow control valve according to another implementation.

As illustrated in FIG. 6 and FIG. 7, in some implementations a bypass port may not be needed, a flange 20 may be used to close the bypass port 17 or the bypass port 17 may not be provided in the valve body 7. In these configurations, the control valve would function as one without a bypass port.

Figure 8:
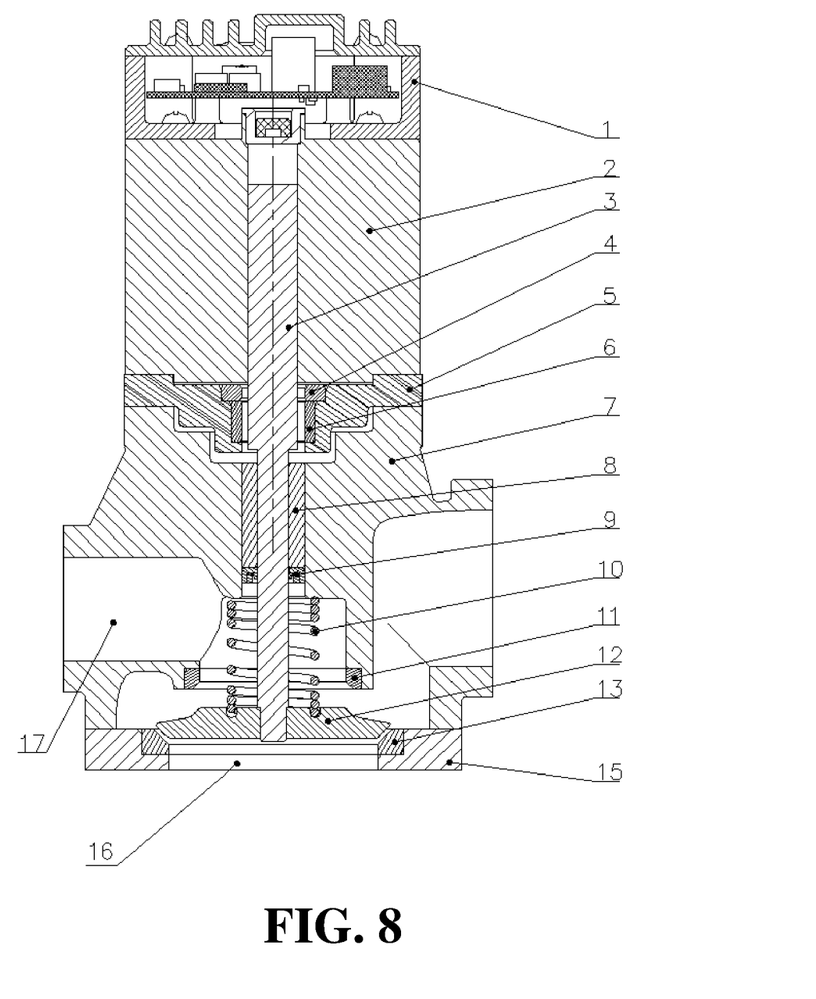
FIG. 8 is an example structure diagram of a gas flow control valve according to another implementation.

As illustrated in FIG. 8, in some implementations, sealing requirements are not as stringent, the sealing ring 14 may be removed, and the lower base 13 and the valve plate 12 may be in direct contact, wherein the contact surface is spherical or conical. For one example, the contact surface on the valve plate 12 is spherical and the contact surface on the lower base 13 is conical. For another example, the contact surfaces on both the valve plate 12 and the lower base 13 are compensating conical.

Figure 9:
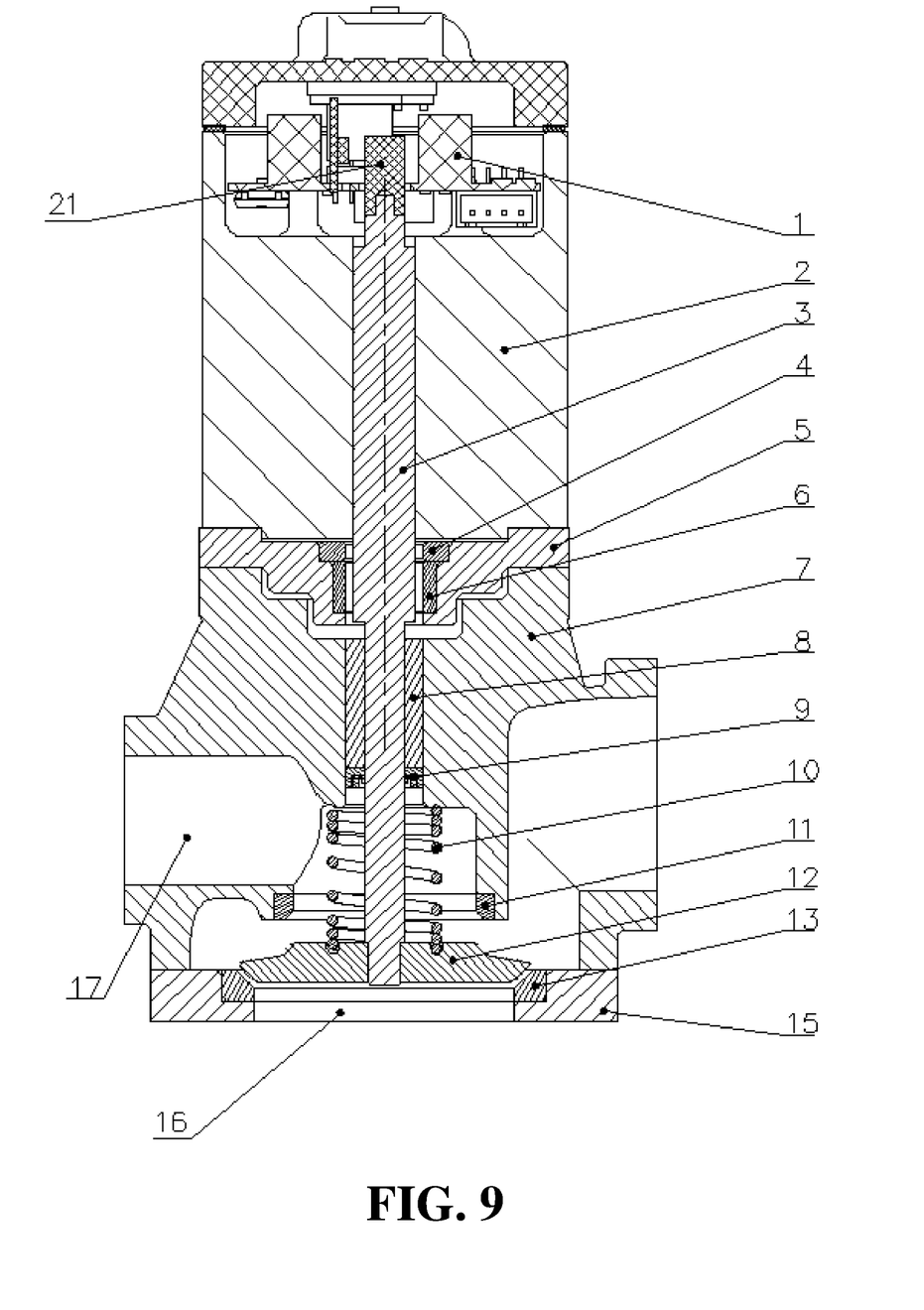
FIG. 9 is an example structure diagram of a gas flow control valve according to another implementation.

As illustrated in FIG. 9, in one implementation, a magnetic steel 21 is directly placed on the tail of the threaded rod 3, so that changes in the position of the valve plate 12 can be directly reflected on the magnetic steel 21 through the threaded rod 3. Thereby, the positioning information of the valve plate 12 may be fed back to a Hall sensor positioned inside the motor controller 1. In this way, the position detection is more direct and accurate, and the control accuracy of the valve plate 12 is improved.

In some implementations, the motor may be, but not limited to, a stepper motor or a servo motor or a brushed motor or a brushless motor.

In another implementation, a control system for a fuel cell stack is provided. The control system may send a command to the motor controller 1 to open the vent valve hole according to the air flow required by the system. After receiving the command, the motor controller 1 controls the threaded sleeve in the motor 2 to rotate in a first direction, and the threaded rod 3 matches the threaded sleeve. The square hole 61 of the first guide sleeve 6 restricts the rotation of the limiting notch 31 of the threaded rod 3, so that the threaded rod 3 will move linearly upward under the push of the threaded sleeve in the motor 2 to lift the valve plate 12 to a specified position, thereby controlling the air flow. Correspondingly, when the air flow is too high, the fuel cell stack control system will send an instruction to the motor controller 1 to close the vent hole 16 and control the motor 2 to rotate in a direction opposite to the first direction to close the vent hole 16, and excess air will be discharged into the exhaust system through the bypass port 17. The motor controller 1 may be configured with a Controller Area Network (CAN) communication system and a detection module that feedbacks the position information of the valve plate. The motor controller may read the opening position of the valve plate 12 in real time and communicate to the fuel cell stack control system through the CAN communication system instantaneously. When there's a deviation, the motor control system feedbacks the current state to the fuel cell stack control system, and then the fuel cell stack control system may resend a correction command, achieving dynamic closed-loop control of the open position of the valve plate 12.

During the up and down movement of the threaded rod 3, the second guide sleeve 8 may guide the movement of the threaded rod 3 to ensure that the threaded rod 3 moves linearly, thereby ensuring that the valve plate 12 acts on the sealing ring 14, resulting a good sealing effect on the vent hole 16 in the bottom plate 15. In addition, the contact surface between the valve plate 12 and the limiting base 11 may be a spherical surface or a conical surface, and the sealing method is linear sealing to ensure a better sealing effect. For one example, the contact surface on the valve plate 12 is spherical and the contact surface on the limiting base 11 is conical. For another example, the contact surfaces on both the valve plate 12 and the limiting base 11 are compensating conical.

In one implementation, each time the valve is energized, the motor controller will perform a power-on self-learning to determine the zero and maximum positions of the valve plate, so as to ensure that the zero and maximum positions of the valve are accurate. After long-term operation, based on a determination that the valve is worn, the power-on self-learning function may realize automatic compensation. During the operation of the valve, the actual position of the valve can be fed back through a position sensor in real time to achieve closed-loop control and ensure the accuracy of valve opening.

In addition, the motor controller may send fault codes of the valve to the fuel cell stack control system when the valve has one or more failures during operation. The operation failures may be: motor stop, overcurrent protection (motor current), CAN self-check failure, motor drive part self-check failure, Hall effect sensor failure, over-temperature protection, over-voltage alarm (power supply voltage), undervoltage alarm (power supply voltage), valve stuck, abnormal CAN communication, etc.

For one example, the device for controlling gas flow as described in the present disclosure may be used as an intake control valve, a back pressure valve, and/or a shut-off valve. The intake control valve, the back pressure valve, and/or the shut-off valve may be used to control gas flow for a fuel stack cell. When used in a fuel stack cell, the device for controlling gas flow may be used on cathode side or anode side or both. The device for controlling gas flow as described in the present disclosure may be used to control gas at atmospheric pressure, positive pressure, and/or negative pressure.

One advantage of the gas flow control device and the control system described in the present disclosure is as follows. The motor controller controls the threaded sleeve in the motor to rotate, the threaded rod and the threaded sleeve are matched, while the square hole of the first guide sleeve restricts the rotation of the limiting notch on the threaded rod. In this way, the threaded rod is driven by the threaded sleeve in the motor to move up and down in a straight line, thereby realizing lifting the valve plate, opening the valve to a specified position, and adjusting the flow of air into the stack. Correspondingly, based on determination that the air flow into the fuel cell stack is too large, the motor control rotates the motor in an opposite direction to close the vent valve hole. During the up and down movement of the threaded rod, the second guide sleeve can guide the movement of the threaded rod to ensure that the threaded rod moves linearly, thereby ensuring the cooperation of the valve plate and the sealing ring so that the vent valve hole has a good sealing effect. The contact surface between the valve plate and the limiting base can be spherical or conical, and the sealing method is linear sealing to ensure a better sealing effect. For one example, the contact surface on the valve plate 12 is spherical and the contact surface on the limiting base 11 is conical. For another example, the contact surfaces on both the valve plate 12 and the limiting base 11 are compensating conical.

The words "example" or "implementation" are used herein to illustrate an example, instance, or illustration, and is not necessarily to be construed as preferred or advantageous over other aspects or designs. The term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

While implementations have been illustrated and described, it will be appreciated that various changes can be made therein without departing from the spirit and scope of the disclosure. Moreover, the various features of the implementations described herein are not mutually exclusive. Rather any feature of any implementation described herein may be incorporated into any other suitable implementation. If the concept and technical scheme of the disclosure are directly applied to other occasions, they all fall within the protection scope of the present disclosure.

What is claimed is:

1. A device for controlling gas flow, the device comprising:
   a motor;
   a valve body connected to the motor and including a first slot;
   a threaded sleeve configured to be driven by the motor to rotate;
   a threaded rod matched with the threaded sleeve on a first end of the threaded rod;
   a first guide sleeve;
   a second guide sleeve in axial alignment with the first guide sleeve, wherein the first guide sleeve is positioned between the second guide sleeve and the first end of the threaded rod;
   a compression spring sleeved on the threaded rod and including a first axial end and a second axial end, wherein the compression spring includes a first torque arm located on the first axial end and a second torque arm located on the second axial end; and
   a valve plate connected to a second end of the threaded rod and including a second slot, wherein the valve plate is configured to cover a vent valve hole,
   wherein the first torque arm of the compression spring is configured to fit in the first slot of the valve body, the second torque arm of the compression spring is configured to secure in the second slot of the valve plate to prevent the compression spring from moving in circumferential directions, the compression spring is located between the second guide sleeve and the valve plate, the threaded rod extends through the first guide sleeve and the second guide sleeve, and the first guide sleeve surrounds a part of the threaded rod in axial direction to prevent the threaded rod from rotating.

2. The device of claim 1, further comprising a bypass port provided on the valve body and connected to an intake port provided on the valve body.

3. The device of claim 2, wherein the bypass port is sealable by a flange.

4. The device of claim 1, further comprising a connecting plate arranged between the motor and the valve body, wherein the first guide sleeve is fitted in a chamber in the connecting plate.

5. The device of claim 1, further comprising:
   a bottom plate connected to the valve body; and
   a bottom base connected to the bottom plate, wherein the vent valve hole is fitted through the bottom plate and the bottom base.

6. The device of claim 5, further comprising a sealing ring provided in the bottom base, wherein the sealing ring is configured to be a T-shaped structure, and the valve plate squeezes the sealing ring when the valve plate is in a position sealing the vent valve hole; and the device is configured as a shut-off valve when the valve plate is in the position sealing the vent valve hole.

7. The device of claim 1, further comprising a frame sealing ring, wherein the frame sealing ring surrounds a part of the threaded rod in the axial direction, one end surface of the frame sealing ring is fitted to the second guide sleeve.

8. The device of claim 1, further comprising a compression ring, wherein an end of the compression ring is snugly fitted on the first guide sleeve, preventing the first guide sleeve from moving.

9. The device of claim 1, further comprising a limiting base provided in the valve body and configured to provide a positive stop on movement of the valve plate when the valve plate is in a position that the vent valve hole has a maximum opening.

10. The device of claim 9, wherein a contact surface between the valve plate and the limiting base is a conical or spherical surface.

11. The device of claim 1, wherein the motor is one of a stepper motor, a servo motor, a brushed motor or a brushless motor.

12. The device of claim 1, wherein the first end of the threaded rod is fitted with a magnet configured to assist with position control of the valve plate.

13. The device of claim 1, wherein a square hole is provided on the first guide sleeve, the threaded rod is extended through the square hole, and a part of the threaded rod located in the first guide sleeve is provided with a flat portion configured to prevent the threaded rod from rotating in the square hole.

14. The device of claim 1, further comprising a motor controller configured to control the motor, wherein the motor is controlled to rotate in a first direction or a second direction opposite to the first direction.

15. The device of claim 14, wherein the motor controller comprises a Controller Area Network (CAN) communication system and is configured to detect a valve close position and a valve maximum open position.

16. The device of claim 15, wherein the valve close position corresponds to a position of the threaded rod when the valve plate is in a position sealing the vent valve hole.

17. A system for controlling gas flow, the system comprising a control module and a control device, wherein the control module is configured to communicate with the control device;
   wherein the control device comprises:
      a motor;
      a valve body connected to the motor;
      a threaded sleeve configured to be driven by the motor to rotate;
      a threaded rod matched with the threaded sleeve on a first end of the threaded rod;
      a second guide sleeve, wherein the threaded rod extends through the second guide sleeve,
      a first guide sleeve in axial alignment with the second guide sleeve and positioned between the first end of the threaded rod and the second guide sleeve, wherein the threaded rod extends through the first guide sleeve and the first guide sleeve surrounds a portion of the threaded rod to obstruct the threaded rod from rotating;
      a compression spring sleeved on the threaded rod and including an axial end, wherein the compression spring is positioned between the second guide sleeve and a second end of the threaded rod that is opposite the first end of the threaded rod; and
      a valve plate connected to the second end of the threaded rod and including a slot, wherein the valve plate is configured to cover a vent valve hole, and the axial end of the compression spring is secured in the slot of the valve plate to prevent the compression spring from moving in circumferential directions.

* * * * *